US009092659B2

(12) United States Patent
Shimada et al.

(10) Patent No.: US 9,092,659 B2
(45) Date of Patent: Jul. 28, 2015

(54) SUBJECT DETERMINATION APPARATUS THAT DETERMINES WHETHER OR NOT SUBJECT IS SPECIFIC SUBJECT (71) Applicant: Casio Computer Co., Ltd., Tokyo (JP)

(72) Inventors: Keisuke Shimada, Hamura (JP); Shigeru Kafuku, Akishima (JP); Masaaki Sasaki, Hachioji (JP)

(73) Assignee: CASIO COMPUTER CO., LTD., Tokyo (JP)

(*) Notice: Subject to any disclaimer, the term of this patent is extended or adjusted under 35 U.S.C. 154(b) by 152 days.

(21) Appl. No.: 13/761,529

(22) Filed: Feb. 7, 2013

(65) Prior Publication Data

US 2013/0202163 A1 Aug. 8, 2013

(30) Foreign Application Priority Data

Feb. 8, 2012 (JP) ................................. 2012-024947

(51) Int. Cl.
G06K 9/00 (2006.01)
(52) U.S. Cl.
CPC .............. G06K 9/00268 (2013.01); G06K 9/00 (2013.01)
(58) Field of Classification Search
CPC .......... G06K 9/00288; G06K 9/00248; G06K 9/00281; G06K 9/00295; G06K 9/00; G06K 9/6255; G06K 9/6807; G06K 9/00624; G06K 9/00228; G06K 9/3233; G06K 9/3241; G06K 9/6292; G06F 17/30; G11B 27/326; G11B 27/28; G10L 25/87; H04H 60/37; H04N 2201/3226; G06T 2207/10016; G06T 7/0044; G06T 7/001; G06T 7/204; G06T 7/2033; G07G 1/0063; G01N 33/54386

USPC ......... 382/103, 118, 128, 165, 218, 116–117, 382/144; 348/126, 130, 267, 87, 222, 333
See application file for complete search history.

(56) References Cited

U.S. PATENT DOCUMENTS 5,640,200 A * 6/1997 Michael .......................... 348/87
7,171,311 B2 * 1/2007 Dai et al. ........................ 702/19

(Continued)

FOREIGN PATENT DOCUMENTS

JP 2005-318515 A 11/2005
JP 2010068128 A 3/2010

OTHER PUBLICATIONS

Japanese Office Action dated Nov. 11, 2014, issued in counterpart Japanese Application No. 2012-024947.

Primary Examiner — Vu Le
Assistant Examiner — Aklilu Woldemariam
(74) Attorney, Agent, or Firm — Holtz, Holtz, Goodman & Chick PC (57) ABSTRACT A subject determination apparatus includes: an image obtaining unit, first and second similarity degree determination units, an information obtaining unit, and a subject determination unit. The second similarity degree determination unit determines whether a similarity degree between a reference image and an image of a candidate region of a specific subject image in one of frame images sequentially obtained by the image obtaining unit is equal to or more than a second threshold value smaller than a first threshold value if the similarity degree is determined by the first similarity degree determination unit to be less than the first threshold value. The information obtaining unit obtains information indicating a similarity degree between the reference image and an image of a region corresponding to the candidate region in another frame image obtained a predetermined number of frames before the one frame image.

9 Claims, 7 Drawing Sheets

(56) References Cited

U.S. PATENT DOCUMENTS

| | | |
|---|---|---|
| 7,376,347 B2 | 5/2008 | Sugimoto |
| 7,853,140 B2 | 12/2010 | Sugimoto |
| 7,903,270 B2 * | 3/2011 | Kamasuka .................. 358/1.14 |
| 8,027,523 B2 * | 9/2011 | Sun et al. ..................... 382/118 |
| 8,218,833 B2 | 7/2012 | Iwamoto |
| 8,355,569 B2 * | 1/2013 | Takahashi .................... 382/165 |
| 8,761,462 B2 * | 6/2014 | Sun et al. ..................... 382/118 |
| 2006/0268345 A1 * | 11/2006 | Silverstein ................... 358/3.26 |
| 2009/0244614 A1 * | 10/2009 | Matsuhira ................... 358/1.15 |
| 2009/0304271 A1 * | 12/2009 | Takahashi .................... 382/165 |
| 2010/0053323 A1 * | 3/2010 | Izawa .......................... 348/136 |
| 2010/0166261 A1 * | 7/2010 | Tsuji ........................... 382/103 |
| 2011/0150428 A1 * | 6/2011 | Eggink ........................ 386/285 |
| 2011/0194732 A1 * | 8/2011 | Tsuji ........................... 382/103 |
| 2012/0039514 A1 * | 2/2012 | Sun et al. ..................... 382/118 |
| 2012/0093368 A1 * | 4/2012 | Choi et al. ................... 382/103 |
| 2012/0117087 A1 * | 5/2012 | Imoto et al. ................. 707/749 |

* cited by examiner

FIG. 7C

SUBJECT DETERMINATION APPARATUS THAT DETERMINES WHETHER OR NOT SUBJECT IS SPECIFIC SUBJECT

BACKGROUND OF THE INVENTION

1. Technical Field

The present invention relates to a subject determination apparatus that determines whether or not a subject is a specific subject, to a subject determination method, and to a recording medium.

2. Description of the Related Art

Heretofore, a technology for performing face detection from frame images obtained sequentially based on image capturing has been disclosed, for example, in a Japanese patent application laid-open publication No. 2005-318515.

SUMMARY OF THE INVENTION

A subject determination apparatus according to an embodiment of the present invention includes: an image obtaining unit that sequentially obtains frame images; a first similarity degree determination unit that determines whether or not a similarity degree between a predetermined reference image and an image of a candidate region of a specific subject image in one of the frame images obtained by the image obtaining unit is equal to or more than a first threshold value; a second similarity degree determination unit that determines whether or not the similarity degree is equal to or more than a second threshold value smaller than the first threshold value in a case where it is determined by the first similarity degree determination unit that the similarity degree is not equal to or more than the first threshold value; an information obtaining unit that obtains information related to a similarity degree between the predetermined reference image and an image of a region, the region corresponding to the candidate region in another frame image obtained a predetermined number of frames before from the one frame image, in a case where it is determined by the second similarity degree determination unit that the similarity degree of the candidate region is equal to or more than the second threshold value; and a subject determination unit that determines whether or not the candidate region is an image region of the specific subject image based on the information obtained by the information obtaining unit.

Moreover, according to an embodiment of the present invention, there is provided a method of specifying a subject by using a subject determination apparatus, the method including the steps of: sequentially obtaining frame images; determining whether or not a similarity degree between a predetermined reference image and an image of a candidate region of a specific subject image in one of the obtained frame images is equal to or more than a first threshold value; determining whether or not the similarity degree between the image of the candidate region and the predetermined reference image is equal to or more than a second threshold value smaller than the first threshold value in a case where it is determined that the similarity degree is not equal to or more than the first threshold value; obtaining information related to a similarity degree between the predetermined reference image and an image of a region, the region corresponding to the candidate region in another frame image obtained a predetermined number of frames before from the one frame image, in a case where it is determined that the similarity degree between the image of the candidate region and the predetermined reference image is equal to or more than the second threshold value; and determining whether or not the candidate region is an image region of the specific subject image based on the obtained information related to the similarity degree.

Furthermore, according to an embodiment of the present invention, there is provided a non-transitory recording medium that records a computer-readable program that allows a computer to function as: a first similarity degree determination unit that determines whether or not a similarity degree between a predetermined reference image and an image of a candidate region of a specific subject image in one of sequentially obtained frame images is equal to or more than a first threshold value; a second similarity degree determination unit that determines whether or not the similarity degree is equal to or more than a second threshold value smaller than the first threshold value in a case where it is determined by the first similarity degree determination unit that the similarity degree is not equal to or more than the first threshold value; an information obtaining unit that obtains information related to a similarity degree between the predetermined reference image and an image of a region, the region corresponding to the candidate region in another frame image obtained a predetermined number of frames before from the one frame image, in a case where it is determined by the second similarity degree determination unit that the similarity degree of the candidate region is equal to or more than the second threshold value; and a subject determination unit that determines whether or not the candidate region is an image region of the specific subject image based on the information obtained by the information obtaining unit.

PREFERRED EMBODIMENTS OF THE INVENTION

A description is made below of specific embodiments of the present invention by using the drawings. However, the scope of the invention is not limited to the illustrated examples.

Figure 1:
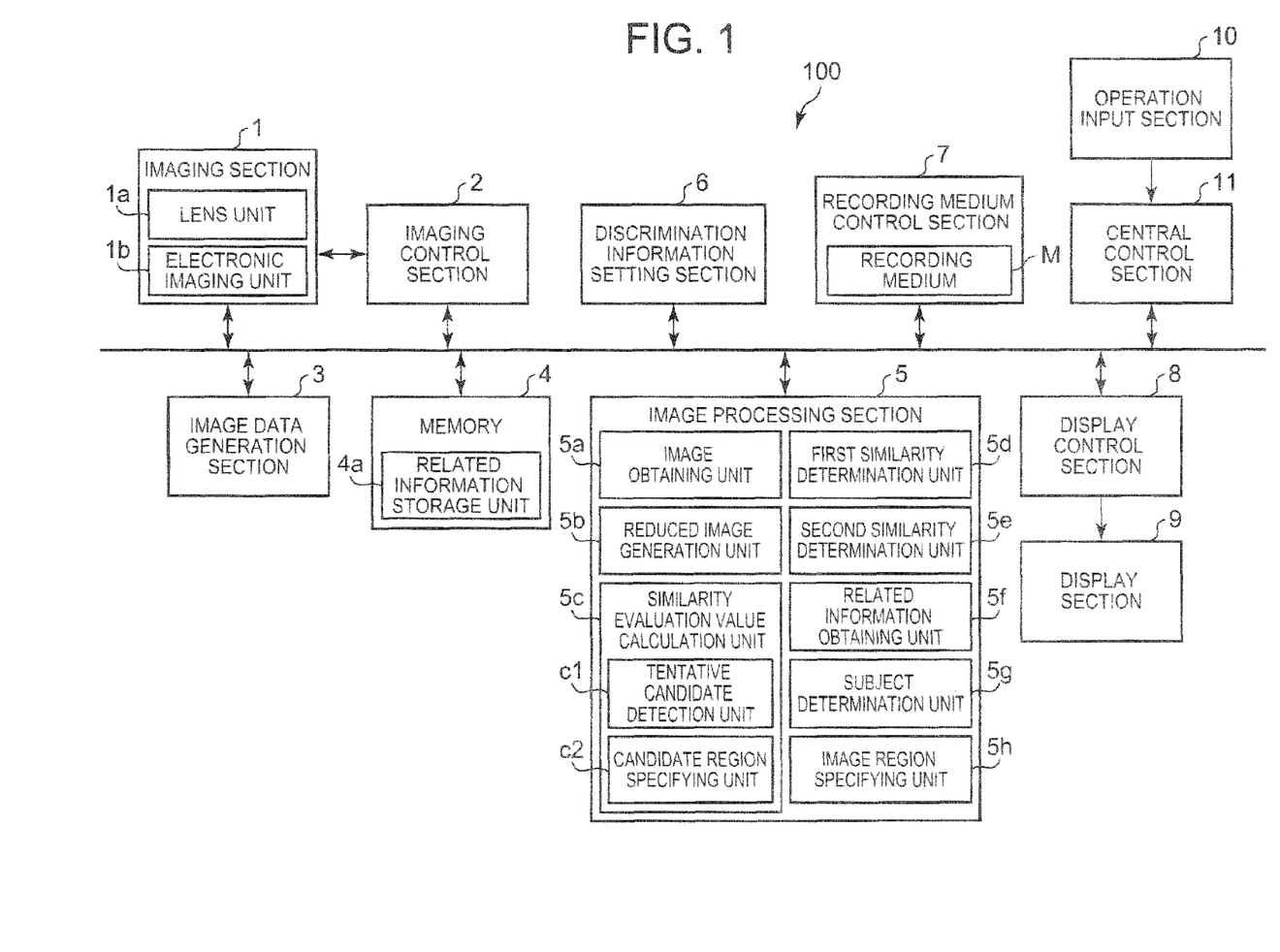
FIG. 1 is a block diagram showing a schematic configuration of an image capturing apparatus according to an embodiment to which the present invention is applied.

FIG. 1 is a block diagram showing a schematic configuration of an image capturing apparatus 100 to which the present invention is applied.

In the case where it is determined that a similarity degree of a candidate region A of a specific subject image is not equal to or more than a first threshold value, the image capturing apparatus 100 of this embodiment determines whether or not the similarity degree concerned is equal to or more than a second threshold value. Moreover, in the case where it is determined that the similarity degree of the candidate region A of the specific subject image is equal to or more than the second threshold value, the image capturing apparatus 100 obtains similarity degree information related to a similarity degree between a predetermined reference image and an image of a region B, which corresponds to the candidate region A of the specific subject image, in another frame image obtained a predetermined number of frames before from one frame image. Then, while taking the obtained similarity degree information as a reference, the image capturing apparatus 100 determines whether or not the candidate region A of the specific subject image, which corresponds to the region B in the one frame image, is an image region D of the specific subject image.

As shown in FIG. 1, the image capturing apparatus 100 specifically includes an imaging section 1, an imaging control section 2, an image data generation section 3, a memory 4, an image processing section 5, a discrimination information setting section 6, a recoding medium control section 7, a display control section 8, a display section 9, an operation input section 10, and a central control section 11.

As an imaging unit, the imaging section 1 captures an image of a subject, and generates frame images F. Specifically, the imaging section 1 includes a lens unit 1a and an electronic imaging unit 1b.

The lens unit 1a is composed of a plurality of lenses such as a zoom lens and a focus lens.

The electronic imaging unit 1b is composed, for example, of an image sensor such as a charge coupled device (CCD) and a complementary metal-oxide semiconductor (CMOS), and converts an optical image, which has passed through a variety of the lenses of the lens unit 1a, into a two-dimensional image signal.

Note that, though not shown, the imaging section 1 may include a diaphragm that adjusts a quantity of light that passes through the lens unit 1a.

The imaging control section 2 controls an image capturing of the subject by the imaging section 1. That is to say, though not shown, the imaging control section 2 includes a timing generator, a driver and the like. Then, the imaging control section 2 drives the electronic imaging unit 1b in a scanning manner by the timing generator and the driver, and converts the optical image into the two-dimensional image signal by the electronic imaging unit 1b in every predetermined cycle. Then, the imaging control section 2 reads out the frame images F from an imaging region of the electronic imaging unit 1b by every amount of one screen, and outputs the read-out frame images F to the image data generation section 3.

Moreover, the imaging control section 2 performs adjustment/control for imaging conditions of the subject, such as automatic focus processing (AF), automatic exposure processing (AE) and automatic white balance (AWB).

The image data generation section 3 appropriately performs gain adjustment for analog-value signals of the frame images F, which are transferred thereto from the electronic imaging unit 1b, for each of color components of R, G and B, thereafter, performs sample holding for the signals concerned by a sample-and-hold circuit (not shown), and coverts the signals into digital data by an A/D converter (not shown). Then, the image data generation section 3 performs color process treatment, which includes pixel interpolation processing and γ-correction processing, for the digital data by a color process circuit (not shown), and thereafter, generates digital-value luminance signals Y and color-difference signals Cb and Cr (YUV data). As described above, the image data generation section 3 generates image data of the frame images F from such a captured image.

Moreover, the image data generation section 3 performs reduction processing for the generated YUV data of the frame images at a predetermined amplification both horizontally and vertically, and generates image data for live view display, which have a low resolution (for example, a VGA size, a QVGA size and the like). Specifically, the image data generation section 3 generates the low-resolution image data for the live view display from the YUV data of the frame images F at predetermined timing corresponding to a predetermined display frame rate of a live view image by the display section 9.

Note that the generated image data (YUV data) are DMA-transferred through a DMA controller (not shown) to the memory 4 for use as a buffer memory.

The memory 4 is composed, for example, of a dynamic random access memory (DRAM) or the like, and temporarily memorizes data and the like, which are to be processed by the image data generation section 3, the image processing section 5, the discrimination information setting section 6, the central control section 11, and the like. Specifically, the memory 4 temporarily memorizes the image data of the frame images F for the live view display, of which amount is equivalent to a predetermined number of frames. Here, the image data are data generated by the image data generation section 3.

Moreover, the memory 4 includes a related information storage unit 4a for temporarily storing the similarity degree information related to subject detection processing to be described later.

The related information storage unit 4a is composed, for example, of a ring buffer. The related information storage unit 4a sequentially stores, as a data history, the similarity degree information related to a similarity degree between the predetermined reference image and each of images of candidate regions A (refer to FIG. 7A) of specific subject images in the frame images F of which amount is equivalent to the predetermined number of frames. Here, the similarity degree is calculated by a similarity degree evaluation value calculation unit 5c of the image processing section 5. Here, among a plurality of the candidate regions A ... in another frame image Fm generated by the image data generation section 3 predetermined frames (for example, one frame) before from one frame image Fn, a region, which has coordinates corresponding to coordinates (for example, coordinates of a center, four corners of a rectangular region, and the like) of the candidate region in the one frame image Fn, becomes the region B (refer to FIG. 7B) corresponding to the candidate region A of the specific subject image.

Moreover, as the similarity degree information, there are mentioned: an evaluation value related to a similarity degree between the predetermined reference image and an image of the candidate region A (including the region B) of the specific subject image in the other frame image Fm; a coordinate position of the candidate region A in an XY plane space; a size defined by the number of pixels composing the candidate region A concerned, and the like; an orientation of the specific subject image with respect to the XY plane space; the number of tentative candidate regions (described later) detected at substantially equal positions in a plurality of reduced image data R . . . of the respective frame images F for use in specifying the candidate region A concerned; and the like.

Note that, for example, in the case where a sub-detector (described later) for use in detecting a face image as the specific subject image is provided in response to an orientation of a face, the orientation of the specific subject image may be defined in response to a type of the sub-detector concerned.

As described above, the related information storage unit 4a memorizes the similarity degree between the predetermined reference image and the image of the region B corresponding to the candidate region A of the specific subject image in the other frame image Fm. Here, the similarity degree is calculated in advance. Moreover, the related information storage unit 4a memorizes the number of tentative candidate regions of the specific subject image, which are calculated from the plurality of reduced images at the substantially equal positions.

The image processing section 5 includes an image obtaining unit 5a, a reduced image generation unit 5b, the similarity degree evaluation value calculation unit 5c, a first similarity degree determination unit 5d, a second similarity degree determination unit 5e, a related information obtaining unit 5f, a subject determination unit 5g, and an image region specifying unit 5h.

The image obtaining unit 5a sequentially obtains the frame images F.

That is to say, from the memory 4, the image obtaining unit 5a sequentially obtains the image data (for example, data of the luminance signals Y, and the like) for the live view display of the frame images F. Here, the image data is generated at the predetermined timing by the image data generation section 3.

The reduced image generation unit 5b generates the reduced image data R from the image data of the frame images F.

That is to say, as an image reducing unit, the reduced image generation unit 5b sequentially generates reduced images by sequentially reducing the respective frame images F, which are sequentially obtained by the image obtaining unit 5a, at a predetermined ratio. Specifically, based on the image data of the respective frame images F, the reduced image generation unit 5b reduces pixels in the respective horizontal (x-axis) and vertical (y-axis) directions in the image data at every predetermined ratio (for example, by 0.9 time), and thereby sequentially generates the reduced image data R in which the resolution is reduced step by step (refer to FIG. 4A to FIG. 4F).

Note that the number of generating the reduced image data R (that is, the number of reduction times) is appropriately and arbitrarily changeable in consideration of a size of luminance data to be inputted, discrimination accuracy of such image regions D (refer to FIG. 7C) of the specific subject image, and the like.

The similarity degree evaluation value calculation unit 5c calculates an evaluation value related to the similarity degree between the predetermined reference image and the image of the candidate region A of the specific subject image of each of the frame images F.

That is to say, for each of the image data of the respective frame images F sequentially obtained by the image obtaining unit 5a and of the reduced image data R generated by the reduced image generation section 5, the similarity degree evaluation value calculation unit 5c implements various pieces of image processing, for example, such as face detection processing, edge detection processing and feature extraction processing, and extracts the plurality of candidate regions A (regions corresponding to detection frames Wb in FIG. 7C) of the specific subject image. Then, for example, the similarity degree evaluation value calculation unit 5c calculates an evaluation value related to a similarity degree between image data of each of the candidate regions A and image data of the predetermined reference image.

Specifically, the similarity degree evaluation value calculation unit 5c includes a tentative candidate detection unit c1 and a candidate region specifying unit c2.

As a detection unit, the tentative candidate detection unit c1 detects the tentative candidate region of the specific subject image from each of the plurality of reduced image data R . . . sequentially generated by the reduced image generation unit 5b.

Figure 5:
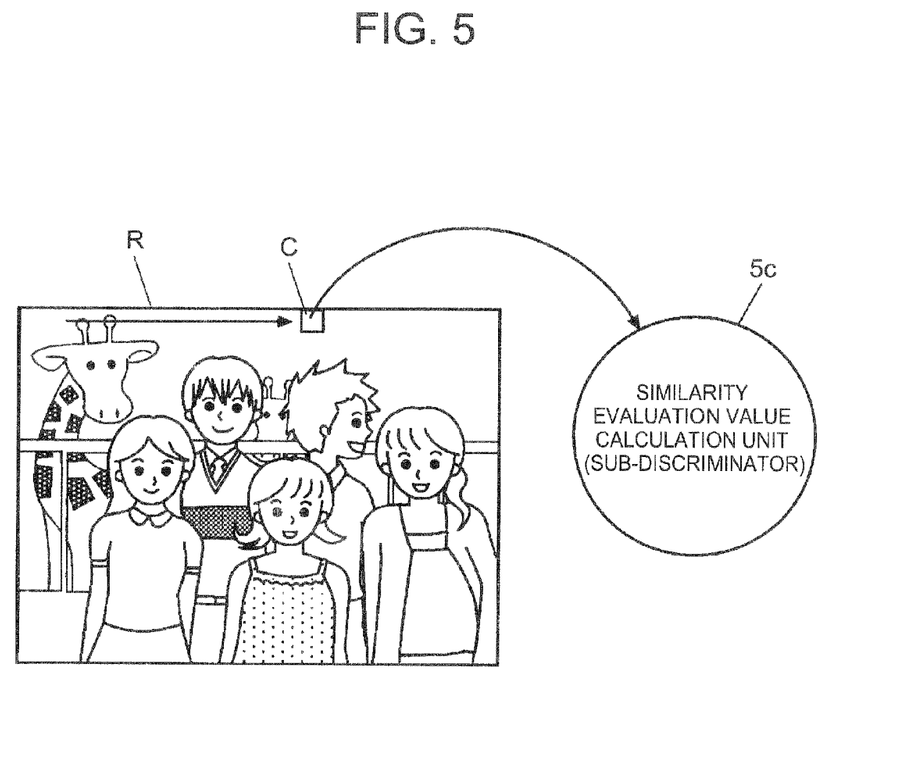
FIG. 5 is a view schematically showing an example of a discrimination target region related to the frame images of FIG. 3.

That is to say, for example, the tentative candidate detection unit c1 generates a plurality of discrimination target regions C with a predetermined size (for example, 24×24 pixels) from the reduced image data R in which the resolution of the one frame image Fn is reduced by a predetermined step (refer to FIG. 5). Then, the tentative candidate detection unit c1 calculates an evaluation value related to a similarity degree between image data of each of the discrimination target regions C and the image data of the predetermined reference image, for example, by using adaboost output calculation.

Specifically, the tentative candidate detection unit c1 includes a plurality of sub-discriminators for calculating the similarity degree between each of the discrimination target regions C and the predetermined reference image and determining whether or not the discrimination target region C is a face. For example, these sub-discriminators are provided for each orientation (angle) of the face (for example, for each of a front face, right and left side views, and the like).

Moreover, these sub-discriminators are defined separately for a plurality (for example, 20) of stages. For example, a predetermined number of the sub-discriminators are defined for each of the stages such that two thereof are defined for a first stage, five thereof are defined for a second stage, ten thereof are defined for a third stage, and twenty thereof are defined for a fourth stage. Note that, for such sub-discriminators defined at a lower (smaller numeric-value) stage, reliability of determining whether or not the discrimination target region C is the face may be set higher.

Then, the tentative candidate detection unit c1 sequentially inputs the image data of the discrimination target regions C to the sub-discriminators at the respective stages in order of the stages. The tentative candidate detection unit c1 inputs the image data ("T" in FIG. 6), which is determined to be the face in all the sub-discriminators at one stage, to the sub-discriminators at the next stage, and meanwhile, for the image ("F" in FIG. 6) determined not to be the face therein, discontinues subsequent discrimination. The tentative candidate detection unit c1 calculates the evaluation values for the respective discrimination target regions C in accordance with discrimination results of the sub-discriminators. Specifically, in the case where each of the discrimination target regions C is determined to be the face in all the sub-discriminators defined at each of the stages in the plurality of stages which define the plurality of sub-discriminators, the tentative candidate detection unit c1 passes the discrimination target region C through the stage concerned, and transfers the discrimination target region C to the next stage. Thereafter, the tentative candidate detection unit c1 calculates a value, which is obtained by adding up the number of sub-discriminators defined in all the stages through which the discrimination target region C passes, as the evaluation value. Meanwhile, in the case where the number of stages through which the discrimination target region C passes is "0" (the case where the discrimination target region C is not transferred to the second stage since the discrimination target region C cannot pass through the first stage), then for example, the tentative candidate detection unit c1 calculates a predetermined lowest value such as a negative value as the evaluation value.

Then, the tentative candidate detection unit c1 detects such a discrimination target region C, in which the evaluation value is larger than a predetermined value (for example, zero "0"), or a region within a predetermined range, which includes the discrimination target region C concerned, as each of the tentative candidate regions (each region corresponding to each detection frame Wa in FIG. 7A) of the specific subject image.

Figure 6:
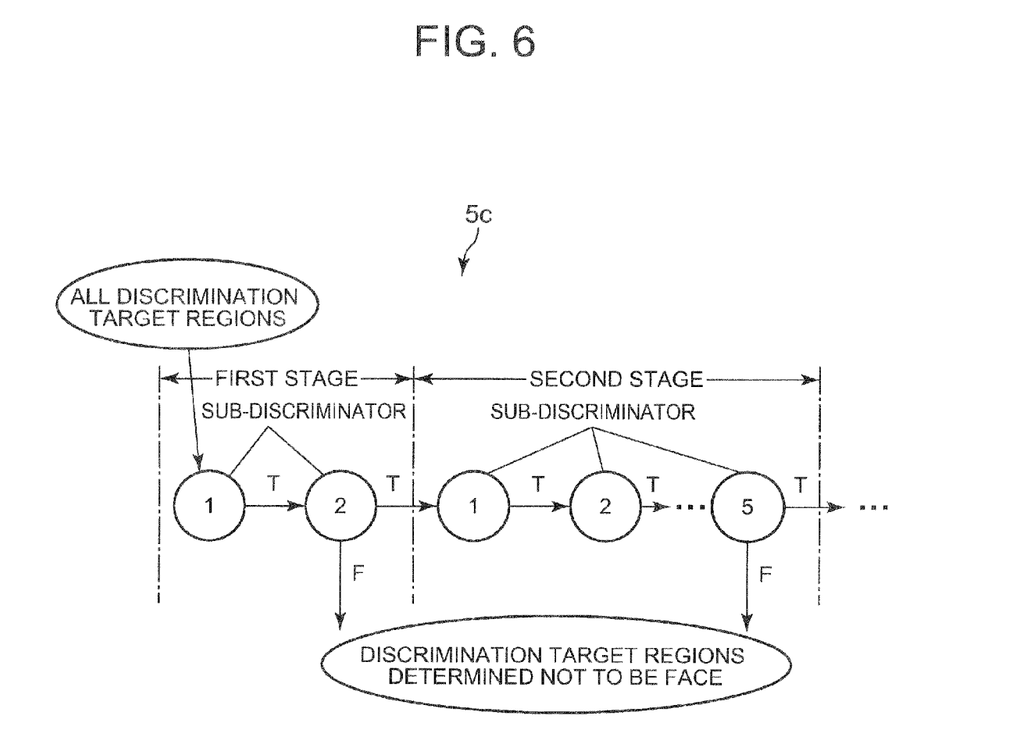
FIG. 6 is a view schematically showing an example of configurations of discriminators of a similarity degree evaluation value calculation unit related to the subject detection processing of FIG. 2.

For example, as shown in FIG. 6, the tentative candidate detection unit c1 inputs the image data of the discrimination target regions C to two sub-discriminators of the first stage in a predetermined order, and inputs the image data of the discrimination target regions C, which are determined to be the face in both of these two sub-discriminators, to the sub-discriminators of the second stage as the next stage. Meanwhile, in the case where it is determined that the similarity degree calculated by the tentative candidate detection unit c1 is less than the preset threshold value by up to the second sub-discriminator of the first stage, the tentative candidate detection unit c1 discontinues the subsequent discrimination for the image data concerned, and calculates a predetermined negative value as the evaluation value. Specifically, for example, the sub-discriminators of the first stage are discriminators which determine an image region with a small luminance change, such as a blue sky and a solid-color background portion. In the case where it is determined that an image region is the image region with the small luminance change, such as the blue sky and the solid-color background portion, at the first stage concerned, the subsequent discrimination as to whether or not the image data is the face is discontinued.

Moreover, in a similar way to the first stage, the tentative candidate detection unit c1 inputs the image data of the discrimination target regions C, which are determined to be the face at the first stage, to five sub-discriminators of the second stage, in a predetermined order, and inputs the image data, in which the similarity degree calculated by from the first sub-discriminator up to the fifth sub-discriminator is determined to be equal to or more than the preset threshold value, to sub-discriminators of the third stage as a next stage. Meanwhile, in the case where it is determined that the similarity degree calculated by the tentative candidate detection unit c1 from the first sub-discriminator of the second stage up to the fifth sub-discriminator thereof is less than the threshold value, the tentative candidate detection unit c1 discontinues subsequent discrimination for the image data concerned, and calculates, as the evaluation value, the total number ("2" in the case where the discrimination target regions C pass only through the first stage) of the sub-discriminators up to the stage (first stage) one before the stage through which the discrimination target regions C have passed.

Also at the third stage and after, the tentative candidate detection unit c1 sequentially calculates the similarities in a similar way to the above. That is to say, an image region having a higher possibility of being determined to be the face is inputted to a sub-discriminator at a more advanced stage.

Note that such a calculation method of the similarity degree by the similarity degree evaluation value calculation unit 5c is merely an example, and a calculation method according to the present invention is not limited to this, and is changeable as appropriate. For example, the number of the sub-discriminators concerned with the calculation of the evaluation values may be differentiated in response to the orientation of the face (for example, the evaluation value of the front face is set high, and the evaluation value in the case where the face is directed sideward or downward is set low, and so on).

Moreover, for example, the image data of the predetermined reference image is information memorized in temporarily memorizing means (not shown) of the image processing section 5, and is various pieces of discriminating information for determining whether or not the discrimination target regions C are the specific subject. The discriminating information is various pieces of information for determining whether or not the discrimination target regions C, which are to be inputted to predetermined sub-discriminators, are the specific subject image (for example, the face and the like). For example, the discriminating information includes those of the neural net, the adaboost, the support vector machine and the like.

Note that, for example, the discriminating information may be information in which a shape of a "human face", an "animal" or the like is taken as a reference, in which a color tone such as the fact as to whether the discrimination target regions C have a vivid (fancy) tone with high brightness and chroma or as to whether a color thereof is peach is taken as a reference, in which a size such as a ratio of the discrimination target regions C with respect to an image of the whole of an angle of view (for example, whether or not a half or more of the image is occupied) is taken as a reference, or the like.

Moreover, the face detection processing, the edge detection processing and the feature extraction processing are technologies known in public, and accordingly, a detailed description thereof is omitted here.

Based on the tentative candidate regions of the specific subject image, which are detected from the plurality of reduced image data R . . . at the substantially equal positions of the respective frame images F by the tentative candidate detection unit c1, the candidate region specifying unit c2 as a candidate specifying unit specifies the candidate region A of the specific subject image in the frame images F concerned.

That is to say, in the case where the tentative candidate regions of the specific subject image are detected from the plurality of reduced image data R . . . of the respective frame images F, then based on the coordinate positions in the XY plane spaces, which are of the predetermined number of the detected tentative candidate regions of the specific subject image, on the sizes (number of constituent pixels) thereof, and on the like, the candidate region specifying unit c2 integrates these tentative candidate regions with one another, and specifies the candidate regions A (regions corresponding to the detection frames Wb in FIG. 7C) of the specific image in the respective frame images F. Specifically, the candidate region specifying unit c2 performs a predetermined arithmetic operation (for example, weighted averaging and the like) while taking as references the sizes of the plurality of tentative candidate regions detected from the plurality of reduced image data R . . . at the substantially equal positions of the XY plane spaces (for example, among the positions, deviation amounts of the center coordinate are within a predetermined number of pixels in a state where the sizes of the plurality of reduced images in the respective vertical and horizontal directions are aligned with one another), and thereby specifies a size the candidate region A of the specific subject image, which represents the sizes of the plurality of tentative candidate regions concerned. Moreover, the candidate region specifying unit c2 performs a predetermined arithmetic operation while taking as references the evaluation values of the plurality of tentative candidate regions for use in the integration, and thereby calculates an evaluation value of the candidate region A of the specific subject image, which represents the evaluation values of the plurality of tentative candidate regions concerned. Furthermore, the candidate region specifying unit c2 performs a predetermined arithmetic operation while taking as references the coordinate positions of the plurality of tentative candidate regions for use in the integration, and thereby specifies a position (for example, the center coordinate or the like) of the candidate region A of the specific subject image, which represents the positions of the plurality of tentative candidate regions concerned.

Note that the evaluation value, position, size and the like of the candidate region A of the specific subject image, which are specified by the candidate region specifying unit c2, are stored as the similarity degree information in the related information storage unit 4a of the memory 4.

The candidate region specifying unit c2 calculates the evaluation value of the candidate region A of the specific subject image concerned based on the evaluation values of the plurality of tentative candidate regions. However, by using the adaboost output calculation, for example, the candidate region specifying unit c2 may calculate an evaluation value related to a similarity degree between the predetermined reference image and the image data of the candidate region A of the specific subject image, which represents the plurality of tentative candidate regions at the substantially equal positions in the XY plane spaces.

Moreover, the candidate region specifying unit c2 may directly specify the candidate region A of the specific subject image from the respective frame images F, which are obtained by the image obtaining unit 5a, without specifying the candidate region A of the specific subject image based on the plurality of tentative candidate regions detected by the tentative candidate unit c1.

The first similarity degree determination unit 5d determines whether or not the evaluation value of the candidate region A of the specific subject image in the one frame image Fn is equal to or more than the first threshold value.

That is to say, as a first similarity degree determination unit, the first similarity degree determination unit 5d determines whether or not an evaluation value related to a similarity degree between the image of the candidate region A of the specific subject image in the one frame image Fn obtained by the image obtaining unit 5a and a predetermined reference image serving as a determination criteria of the specific subject image concerned is equal to or more than the first threshold value. Specifically, the first similarity degree determination unit 5d determines whether or not each evaluation value of the candidate region A of the specific subject image in the one frame image Fn, which is calculated by the similarity degree evaluation value calculation unit 5c, is equal to or more than the first threshold value.

Note that, for example, the first threshold value and the second threshold value that will be described later may be predetermined values inputted based on a predetermined operation for the operation input unit 10 by a user, predetermined values preset as defaults, or the like.

The second similarity degree determination unit 5e determines whether or not the evaluation value of the candidate region A of the specific subject image in the one frame image Fn is equal to or more than the second threshold value smaller than the first threshold value.

That is to say, in the case where it is determined by the first similarity degree determination unit 5d that the evaluation value of the candidate region A of the specific subject image is not equal to or more than the first threshold value, the second similarity degree determination unit 5e as a second similarity degree determination unit determines whether or not the evaluation value concerned is equal to or more than the second threshold value smaller than the first threshold value.

The related information obtaining unit 5f obtains the similarity degree information related to the similarity degree between the predetermined reference image and the image of the region B in the other frame image Fm.

That is to say, in the case where it is determined by the second similarity degree determination unit 5e that the evaluation value of the image of the candidate region A of the specific subject image is equal to or more than the second threshold value, the related information obtaining unit 5f as an information obtaining unit obtains the similarity degree information related to the similarity degree between the predetermined reference image and the image of the region B, which corresponds to the candidate region A of the specific subject image concerned, in the other frame image Fm obtained the predetermined number of frames before from the one frame image Fn.

Figure 7A:
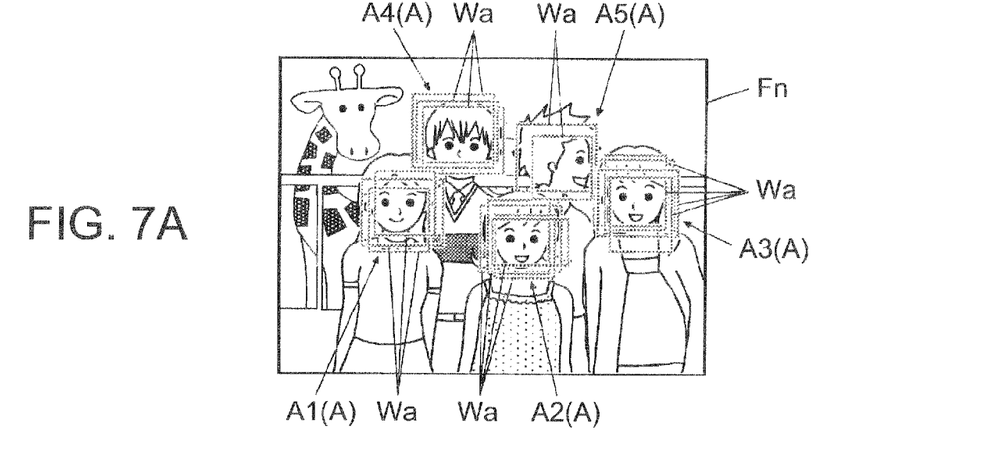
FIG. 7A is a view schematically showing an example of specific subject images related to the subject detection processing of FIG. 2.
Figure 7B:
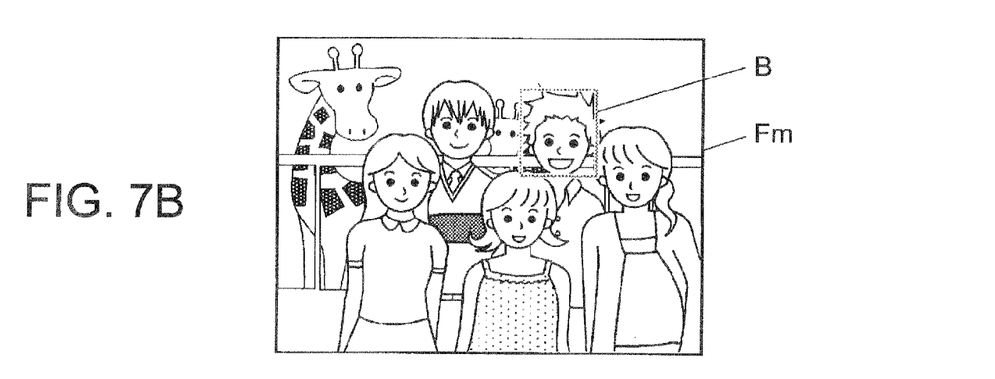
FIG. 7B is a view schematically showing an example of the specific subject images related to the subject detection processing of FIG. 2.

Specifically, the related information obtaining unit 5f specifies the region (region B) that has the coordinates corresponding to the coordinates of the candidate region A of the specific subject image, in which it is determined by the second similarity degree determination unit 5e that the evaluation value is equal to or more than the second threshold value, in the other frame image Fm generated the predetermined number of frames (for example, one frame or the like) before from the one frame image Fn (refer to FIG. 7B). Then, the related information obtaining unit 5f obtains the similarity degree information of the specified region B from the related information storage unit 4a of the memory 4. For example, the related information obtaining unit 5f obtains, as the similarity degree information, an evaluation value regarding the similarity degree between the image data of the region B and the image data of the predetermined reference image, the number of the tentative candidate regions used for specifying the candidate region A of the specific subject image, which corresponds to the region B concerned, and the like from the related information storage unit 4a.

Note that the other frame image Fm may have one frame or a plurality of frames. For example, in the case of the plurality of frames, the related information obtaining unit 5f obtains similarity degree information of a region B in a frame image F one frame before therefrom. Then, in the case where it is determined that the candidate region A of the specific subject image should not be specified as the image region D of the specific subject image as a result of a determination by the subject determination unit 5g to be described later, the related information obtaining unit 5f may obtain similarity degree information of a region B in a frame image F two frames before. As described above, the related information obtaining unit 5f may sequentially treat the frame images F, each of which is generated one frame before, as processing targets.

Alternatively, the related information obtaining unit 5*f* may treat a predetermined number of the frame images F as the processing targets, obtain the relative degree information of the regions B in the respective frame images F, and allow the subject determination unit 5*g*, which will be described later, to determine the similarity degree information.

The subject determination unit 5*g* determines whether or not the candidate region A of the specific subject image in the one frame image Fn should be specified as the image region D of the specific subject image.

Specifically, as a subject determination unit, the subject determination unit 5*g* determines whether or not the candidate region A is the image region D of the specific subject image based on the similarity degree information obtained by the related information obtaining unit 5*f*. Specifically, the subject determination unit 5*g* determines whether or not the evaluation value of the region B, which is the similarity degree information obtained by the related information obtaining unit 5*f*, is equal to or more than a predetermined determination value (for example, a predetermined value at least larger than the second threshold value, and the like). Moreover, the subject determination unit 5*g* determines whether or not the number of the tentative candidate regions, which is the similarity degree information obtained by the related information obtaining unit 5*f*, is equal to or more than a predetermined determination value (for example, two).

Here, "two" is mentioned as an example of the predetermined determination value; however, the predetermined determination value may be changed to an arbitrary value depending on conditions such as the number of the discriminators for use in the face detection, the threshold values and the like.

Then, in the case where it is determined that the evaluation value of the region B is equal to or more than the predetermined determination value, and where it is determined that the number of the tentative candidate regions is equal to or more than the predetermined determination value, the subject determination unit 5*g* determines that the candidate region A of the specific subject image, which corresponds to the region B in the one frame image Fn, should be specified as the image region D of the specific subject image.

Note that, in the case where it is determined that either one of the evaluation value of the region B and the number of the tentative candidate regions is equal to or more than the predetermined determination value, the subject determination unit 5*g* may determine that the candidate region A of the specific subject image, which corresponds to the region B in the one frame image Fn, should be specified as the image region D of the specific subject image.

The image region specifying unit 5*h* specifies the image region D of the specific subject image in the one frame image Fn.

Figure 7C:
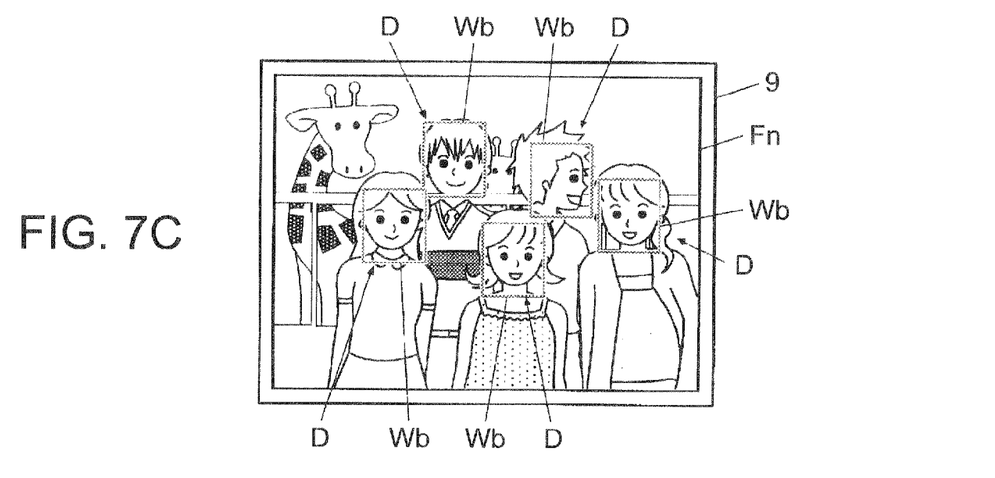
FIG. 7C is a view schematically showing an example of the specific subject images related to the subject detection processing of FIG. 2.

Specifically, the image region specifying unit 5*h* specifies the candidate region A (for example, candidate regions A1 to A4 and the like) of the specific subject image, in which it is determined that the evaluation value is equal to or more than the threshold value by the first similarity degree determination unit 5*d*, as the image region D of the specific subject image (refer to FIG. 7A and FIG. 7C).

Moreover, the image region specifying unit 5*h* specifies the candidate region A of the specific subject image, which corresponds to the region B in which it is determined that the evaluation value is equal to or more than the predetermined determination value by the subject determination unit 5*g*, as the image region D of the specific subject image. Moreover, the image region specifying unit 5*h* specifies the candidate region A of the specific subject image, which corresponds to the region B in which it is determined that the number of the tentative candidate regions of the specific subject image is equal to or more than the predetermined determination value by the subject determination unit 5*g*, as the image region D of the specific subject image.

For example, the image region specifying unit 5*h* specifies a candidate region A (for example, the candidate region A5 or the like), in which it is determined by the subject determination unit 5*g* that the evaluation value is equal to or more than the predetermined determination value and that the number of the tentative candidate regions of the specific subject image is equal to or more than the predetermined determination value, as the image region D of the specific subject image (refer to FIG. 7B and FIG. 7C).

Note that such a specifying method of the image region D of the specific subject image by the image region specifying unit 5*h* is merely an example, and a specifying method according to the embodiment of the present invention is not limited to this, and is changeable appropriately and arbitrarily. For example, the image region specifying unit 5*h* may specify a candidate region A of the specific subject image, which corresponds to the region B in which it is determined that the evaluation value is equal to or more than the predetermined determination value by the subject determination unit 5*g*, as the image region D of the specific subject image. Moreover, the image region specifying unit 5*h* may specify the candidate region A of the specific subject image, which corresponds to the region B in which it is determined that the number of the tentative candidate regions of the specific subject image is equal to or more than a predetermined determination value by the subject determination unit 5*g*, as the image region D of the specific subject image.

The discrimination information setting section 6 sets discrimination information for displaying the specific subject image in a discriminating manner.

That is to say, when the image region D of the specific subject image is specified by the image region specifying unit 5*h*, the discrimination information setting section 6 sets the detection frame Wb, which is displayed on the display section 9 while being superimposed on an edge portion of the image region D of the specific subject image, as the discrimination information for displaying the specific subject image concerned in a discriminating manner.

Note that, though the detection frame Wb, which is displayed while being superimposed on the edge portion of the image region D of the specific subject image, is illustrated as the discrimination information of the specific subject image concerned, the detection frame Wb is merely an example, and discrimination information according to the present invention is not limited to this. The discrimination information is appropriately and arbitrarily changeable as long as the information concerned displays the specific subject image concerned in a discriminating manner. Here, the discrimination information includes a predetermined discrimination marker.

The recording medium control section 7 is configured so that a recording medium M can be freely attachable/detachable thereto/therefrom, and controls readout of data from the recording medium M attached thereto and controls write of data to the recording medium M.

Specifically, the recording medium control section 7 allows the recording medium M to record therein image data for use of recording, which is encoded in accordance with a predetermined compression format (for example, the JPEG format and the like) by an encoding unit (not shown) of the image processing section 5.

Note that, though the recording medium M is composed, for example, of a non-volatile memory (flash memory) and the like, the non-volatile memory is merely an example, and a recording medium according to the present invention is not limited to this, and is changeable appropriately and arbitrarily.

The display control section 8 performs control to read out the image data for use of display, which is temporarily memorized in the memory 4, and to allow the display section 9 to display the image data concerned thereon.

Specifically, the display control section 8 includes a video random access memory (VRAM), a VRAM controller, a digital video encoder, and the like. Then, the digital video encoder periodically reads out the luminance signals Y and the color-difference signals Cb and Cr, which are read out from the memory 4 and memorized in the VRAM (not shown) under the control of the central control section 11, through the VRAM controller from the VRAM, generates video signals based on these data, and outputs the generated video signals to the display section 9.

For example, the display section 9 is a liquid crystal display panel. On a display screen, the display section 9 displays the image, which is captured by the electronic imaging unit 1b, and the like based on the video signals from the video control section 8. Specifically, the display section 9 displays the live view image while sequentially updating the plurality of frame images F . . . at a predetermined display frame rate. Here, the frame images F . . . are captured by the imaging section 1 and the imaging control section 2 and generated by the image data generation section 3 in a still image capturing mode or a moving picture capturing mode. Moreover, the display section 9 displays a "rec view" image of an image to be recorded as a still image, and displays an image that is being recorded as a moving picture.

The operation input section 10 is a section for performing such predetermined operations of the image capturing apparatus 100 concerned. Specifically, the operation input unit 10 includes a shutter button (not shown) for inputting an image capturing instruction of the subject, a selection deciding button (not shown) for inputting selection instructions for the image capturing mode, functions and the like, a zoom button (not shown) for inputting an adjustment instruction of a zoom amount, and the like, and outputs predetermined operation signals to the central control section 11 in response to operations of these buttons by the user.

The central control section 11 is a section that controls the respective sections of the image capturing apparatus 100. Though not shown, specifically, the central control section 11 includes a central processing unit (CPU), a random access memory (RAM), a read only memory (ROM), and the like, and performs a variety of control operations in accordance with a variety of processing programs (not shown) for the image capturing apparatus 100.

Next, a description is made of the subject detection processing by the image capturing apparatus 100 with reference to FIG. 2 to FIG. 7.

Figure 2:
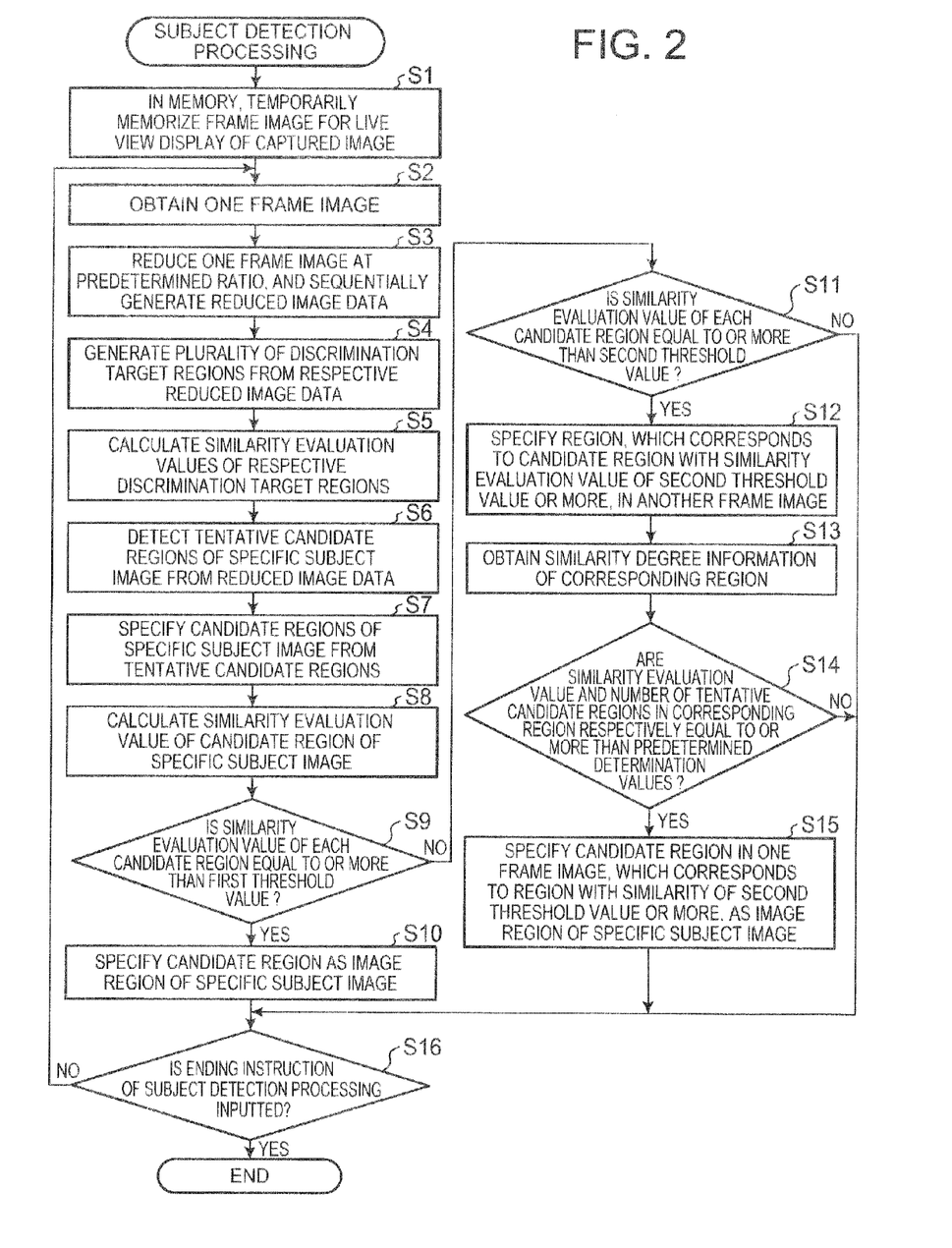
FIG. 2 is a flowchart showing an example of operations related to subject detection processing by the image capturing apparatus of FIG. 1.
Figure 3:
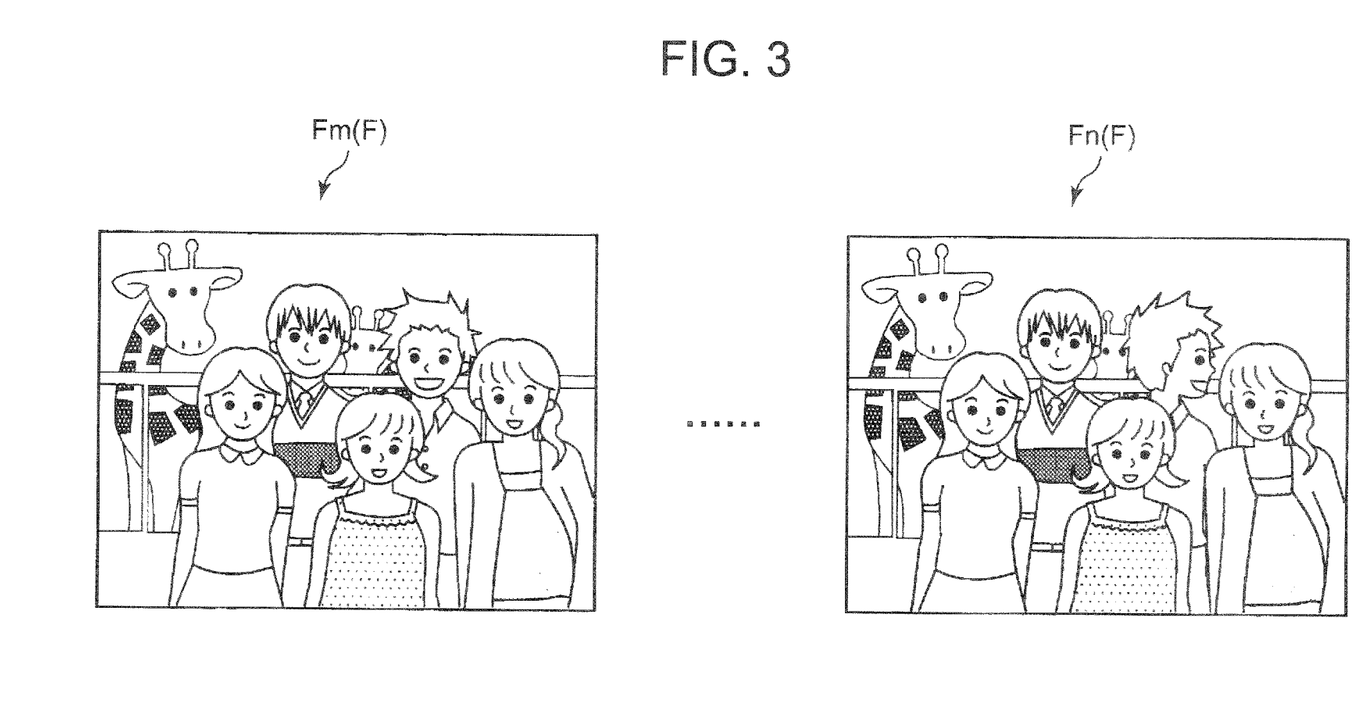
FIG. 3 is a view schematically showing an example of frame images related to the subject detection processing of FIG. 2.
Figure 4A:
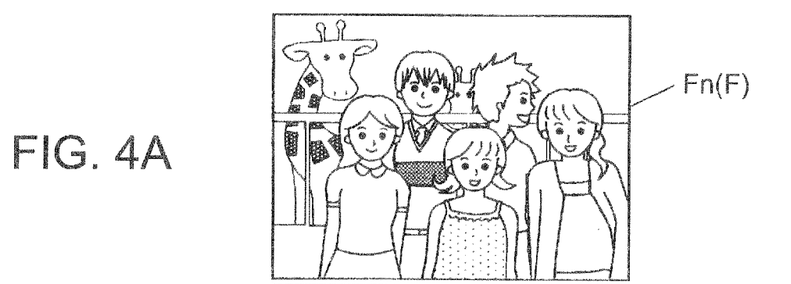
FIG. 4A is a view schematically showing one of the frame images of FIG. 3.
Figure 4B:
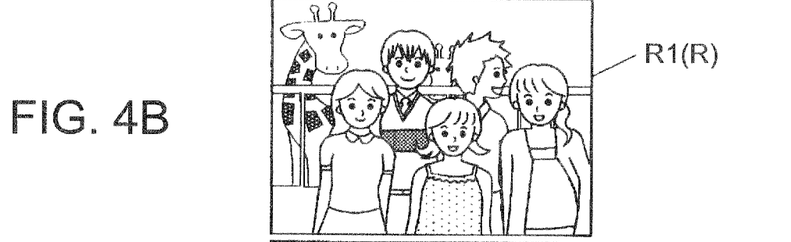
FIG. 4B is a view schematically showing a reduced image of the frame image of FIG. 3.
Figure 4C:
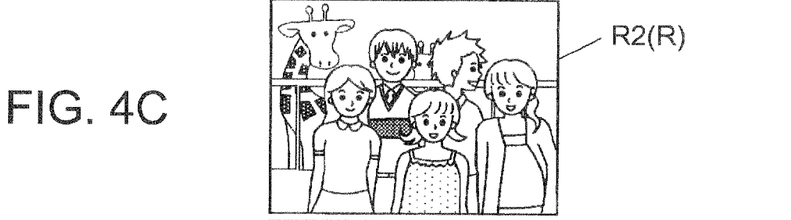
FIG. 4C is a view schematically showing a reduced image of the frame image of FIG. 3.
Figure 4D:
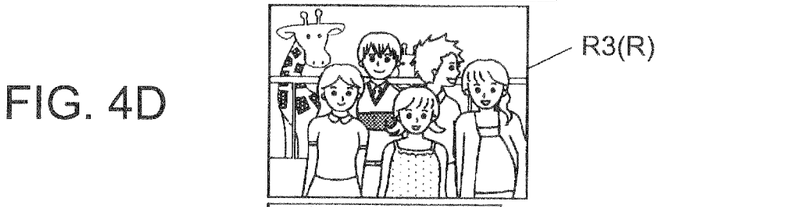
FIG. 4D is a view schematically showing a reduced image of the frame image of FIG. 3.
Figure 4E:
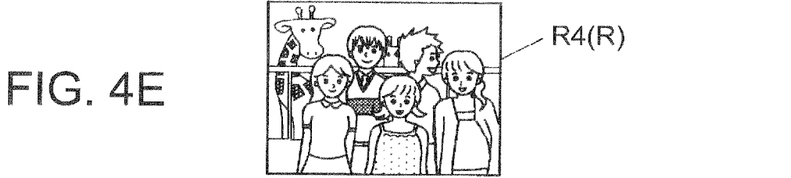
FIG. 4E is a view schematically showing a reduced image of the frame image of FIG. 3.
Figure 4F:
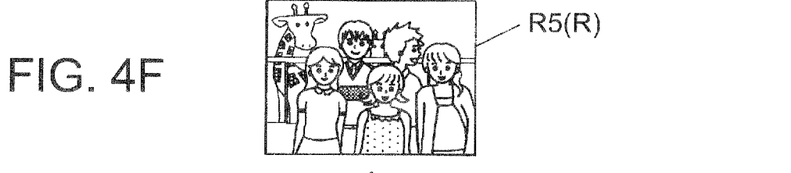
FIG. 4F is a view schematically showing a reduced image of the frame image of FIG. 3.

FIG. 2 is a flowchart showing an example of the operations related to the subject detection processing. Moreover, FIG. 3 is a view schematically showing an example of images related to the subject detection processing. FIG. 4A is a view schematically showing the frame image F, and FIG. 4B to FIG. 4F are views schematically showing the reduced images of the frame image F. FIG. 5 is a view schematically showing an example of the discrimination target region C related to the frame image F. FIG. 6 is a view schematically showing an example of configurations of the sub-discriminators of the similarity degree evaluation value calculation unit 5c related to the subject detection processing. FIGS. 7A to 7C are views schematically showing an example of such specific subject images (face images) related to the subject detection processing.

Note that the subject detection processing, which will be described below, is processing to be executed under the control of the central control section 11 in the case where a subject detection mode is set based on the predetermined operation of the operation input unit 10 by the user.

Moreover, in the following description, it is assumed to use such a frame image F in which face images as the specific subject images are included in the frame image F.

As shown in FIG. 2, first, the central control section 11 sequentially stores such live view display-use image data of the frame images F, which are sequentially generated by the image data generation section 3 by the image capturing of the subjects by the imaging section 1, in the memory 4, and allows the memory 4 to temporarily memorize the image data (Step S1).

Subsequently, the image obtaining unit 5a of the image processing section 5 obtains the live view display-use image data of the one frame image Fn, which serves as a processing target, at the predetermined timing corresponding to the display frame rate by the display section 9 (Step S2).

Next, the reduced image generation unit 5b reduces the pixels in the respective horizontal and vertical directions in the image data of the one frame image Fn, which is obtained by the image obtaining unit 5a, at every predetermined ratio (for example, by 0.9 time), and thereby sequentially generates the reduced image data R (R1 to R5 . . . ) in which the resolution is reduced step by step (Step S3; refer to FIG. 4A to FIG. 4F).

Subsequently, the tentative candidate detection unit c1 of the similarity degree evaluation value calculation unit 5c generates the plurality of discrimination target regions C with the predetermined size (for example, 24×24 pixels) from each of the plurality of reduced image data R . . . (Step S4), and thereafter, calculates the evaluation value related to the similarity degree between the image data of each of the discrimination target regions C and the image data of the predetermined reference image (Step S5). Specifically, the tentative candidate detection unit c1 calculates the evaluation value in accordance with the discrimination results of the sub-discriminators for the image data of each of the discrimination target regions C, for example, by using the adaboost output calculation (refer to FIG. 5 and FIG. 6).

Then, the tentative candidate detection unit c1 detects the discrimination target region C, in which the calculated evaluation value is larger than the predetermined value (for example, 0 "zero"), as the tentative candidate region of the specific subject image (Step S6). Here, a state where the tentative detection frame Wa is superimposed on each of the tentative candidate regions (for example, face regions) of the plurality of specific subject images discriminated in each of the reduced image data R as shown in FIG. 7A is schematically shown. For example, with regard to a person who has a face with a larger area with respect to the whole of the image, such as a person present on a front side in a group picture, or to a person who faces to the front, it is made possible to discriminate a face region thereof even in smaller reduced image data R in the case where the reduced image data R are sequentially generated. That is to say, with regard to the person who has the face with a large area with respect to the whole of the image or faces to the front, it becomes relatively easy to discriminate the face region thereof in comparison with a person who has a face with a smaller area faces to the side. In such a way, on the face region concerned, a larger number of the tentative detection frames Wa are superimposed.

Note that the evaluation value of each discrimination target region C detected as the tentative candidate region is temporarily stored in the related information storage unit 4a of the memory 4.

Next, based on the coordinate positions in the XY plane spaces, which are of the tentative candidate regions of the specific subject image, the tentative candidate regions being detected from the plurality of reduced image data R . . . of the respective frame images F, on the sizes thereof, and on the like, the candidate region specifying unit c2 of the similarity degree evaluation value calculation unit 5c integrates these tentative candidate regions with one another, and specifies the candidate regions A of the specific image in the respective frame images F (Step S7; refer to FIG. 7A). Subsequently, the candidate region specifying unit c2 performs the predetermined arithmetic operation while taking as references the evaluation values of the plurality of tentative candidate regions, and calculates the evaluation value of the candidate region A of the specific subject image (Step S8).

Note that the calculated evaluation value of the candidate region A of the specific subject image is temporarily stored in the related information storage unit 4a of the memory 4.

Then, the first similarity degree determination unit 5d determines whether or not the evaluation value of the candidate region A of the specific subject image in the one frame image Fn, the evaluation value being calculated by the similarity degree evaluation value calculation unit 5c, is equal to or more than the first threshold value (Step S9).

Here, it is determined that the evaluation value of the candidate region A of the specific subject image is equal to or more than the first threshold value (Steep S9; YES), the image region specifying unit 5h specifies the candidate region A (for example, the candidate regions A1 to A4 or the like) of the specific subject image concerned as the image region D of the specific subject image (Step S10; refer to FIG. 7A and FIG. 7C).

Meanwhile, in the case where it is determined in Step S9 that the evaluation value of the candidate region A (for example, the candidate region A5 or the like) is not equal to or more than the first threshold value (Step S9; NO), the second similarity degree determination unit 5e determines whether or not the evaluation value of the candidate region A of the specific subject image concerned is equal to or more than the second threshold value (Step S11).

Here, when it is determined that the evaluation value of the candidate region A of the specific subject image is not equal to or more than the second threshold value (Step S11; YES), the related information obtaining unit 5f specifies the region, in which it is determined that the evaluation value is equal to or more than the second threshold value, in the other frame image Fm generated the predetermined number of frames (for example, one frame or the like) before from the one frame image Fn (Step S12; refer to FIG. 7B), and obtains the similarity degree information of the region B concerned from the related information storage unit 4a of the memory 4 (Step S13). Specifically, the related information obtaining unit 5f obtains, as the similarity degree information, the evaluation degree of the region B, the number of the tentative candidate regions used for specifying the candidate region A of the specific subject image, which corresponds to the region concerned, and the like from the related information storage unit 4a.

Then, the subject determination unit 5g determines whether or not the evaluation value of the region B, which is the similarity degree information obtained by the related information obtaining unit 5f, is equal to or more than the predetermined determination value, and whether or not the number of the tentative candidate regions, which is the similarity degree information obtained by the related information obtaining unit 5f, is equal to or more than the predetermined determination value (Step S14).

Here, when it is determined that the evaluation value of the region B is equal to or more than the predetermined determination value, and that the number of the tentative candidate regions is equal to or more than the predetermined determination value (Step S14; YES), the image region specifying unit 5h specifies the candidate region A of the specific subject image, which corresponds to the region B concerned, that is, specifies the candidate region A of the specific subject image, in which the evaluation value is equal to or more than the second threshold value, as the image region D of the specific subject image (Step S15; refer to FIG. 7C).

Then, after Step S10 and Step S15, the discrimination information setting section 6 sets the detection frame Wb while superimposing the detection frame Wb concerned on the edge portion of the image region D of the specific subject image, which is specified in the one frame image Fn by the image region specifying unit 5h, and the display control section 8 allows the display section 9 to perform the live view display for the one frame image Fn concerned.

Thereafter, the central control section 11 determines whether or not an ending instruction of the subject detection processing is inputted thereto (Step S16). Specifically, the central control section 11 determines whether or not the ending instruction of the subject detection processing is inputted thereto, for example, in response to whether or not the image capturing instruction of the subject is inputted based on a predetermined operation (for example, a full press operation and the like) for the shutter button of the operation input section 10 by the user, or in response to whether or not a mode different from the subject detection mode is set based on a predetermined operation for the selection decision button.

Moreover, also in the case where it is determined in Step S11 that the evaluation value of the candidate region A of the specific subject image is not equal to or more than the second threshold value (Step S11; NO), or where it is determined in Step S14 that the evaluation value of the region B is not equal to or more than the predetermined determination value, or that the number of the tentative candidate regions is not equal to or more than the predetermined determination value (Step S14; NO), the central control section 11 shifts the processing to Step S16, and determines whether or not the ending instruction of the subject detection processing is inputted (Step S16).

When it is determined in Step S16 that the ending instruction of the subject detection processing is not inputted (Step S16; NO), the central control section 11 shifts the processing to Step S2, and the image obtaining unit 5a obtains live view display-use image data of a one new frame image from the memory 4 (Step S2). Thereafter, the central control section 11 executes the respective pieces of processing of Step S3 and after in a similar way to the above.

Meanwhile, when it is determined in Step S16 that the ending instruction of the subject detection processing is inputted (Step S16; YES), the central control section 11 ends the subject detection processing.

As described above, in accordance with the image capturing apparatus 100 of this embodiment, when it is determined that the evaluation value (similarity degree) between the image of the candidate region A of the specific subject image (for example, the face image and the like) in the obtained one frame image Fn (for example, the live view display-use image generated from the captured image, and the like) and the predetermined reference image serving as the determination criteria of the specific subject image concerned is equal to or more than the first threshold value, the candidate region A of the specific subject image is specified as the image region D of the specific subject image. Accordingly, the first threshold value, which is more severe, can be set, whereby it can be determined whether or not the candidate region A of the specific subject image is the image region D of the specific subject image in the one frame image Fn, and the erroneous detection of the specific subject concerned can be reduced.

Meanwhile, in the case where it is determined that the evaluation value of the candidate region A of the specific subject image is not equal to or more than the first threshold value, it is determined whether or not the evaluation value concerned is equal to or more than the second threshold value smaller than the first threshold value. When the evaluation value of the candidate region A of the specific subject image is equal to or more than the second threshold value, the similarity degree information is obtained, which is related to the similarity degree between the predetermined reference image and the image of the region B, which corresponds to the candidate region A of the specific subject image, in the other frame image Fm obtained the predetermined number of frames before from the one frame image Fn. Then, based on the obtained similarity degree information, it is determined whether or not the candidate region A of the specific subject image, which corresponds to the region B in the one frame image Fn, should be specified as the image region D of the specific subject image. Accordingly, if the evaluation value of the candidate region A of the specific subject image is equal to or more than the second threshold value even if the evaluation value concerned is less than the first threshold value, then it can be specified whether or not the candidate region A belongs to the specific subject image based on the similarity degree information of the region B, which corresponds to the candidate region A of the specific subject image concerned, in the other frame image Fm, and the lowering of the detection rate of the specific subject can be suppressed.

As described above, even if the detection rate of the specific subject to be detected by using the more severe first threshold value is lowered by the fact that the threshold value concerned is set, if the evaluation value of the candidate region A of the specific subject image is equal to or more than the second threshold value, then there is room where the candidate region A is specified as the image region D of the specific subject image. Accordingly, the reduction of the erroneous detection of the specific subject can be achieved without lowering the detection rate of the specific subject concerned.

Moreover, in the case where it is determined that the evaluation value between the image of the region B and the predetermined reference image is equal to or more than the predetermined determination value, the image region specifying unit 5h specifies the candidate region A of the specific image, which corresponds to the region B concerned, as the image region D of the specific subject image. Therefore, the image region specifying unit 5h can specify the candidate region A of the specific subject image, which corresponds to the region B in which the evaluation value in the other frame image Fm is equal to or more than the predetermined determination value, as the image region D of the specific subject image, and can appropriately suppress the lowering of the detection rate of the specific subject.

Moreover, in the case where it is determined that the number of the tentative candidate regions of the specific subject image, which correspond to the region B and are detected from the plurality of reduced images at the substantially equal positions, are equal to or more than the predetermined determination value, the image region specifying unit 5h specifies the candidate region A of the specific image, which corresponds to the region B concerned, as the image region D of the specific subject image. Therefore, the image region specifying unit 5h can specify the candidate region A of the specific subject image, which corresponds to the region B in which the number of the tentative candidate regions of the specific subject image in the other frame image Fm is equal to or more than the predetermined determination value, as the image region D of the specific subject image, and can appropriately suppress the lowering of the detection rate of the specific subject.

Moreover, the candidate region A of the specific subject image in the frame F concerned is specified based on the tentative candidate regions of the specific subject image, which are detected from the plurality of reduced image data R . . . at the substantially equal positions. Accordingly, increase and decrease of the number of the tentative candidate regions can be adjusted by increasing and decreasing the number of the reduced image data R to be generated, and it is possible to shorten a time required for the change of the discrimination accuracy of the candidate region A of the specific subject image in the image or the detection processing for the image region D of the specific subject image, and so on.

Note that the present invention is not limited to the above-described embodiment, and may be improved and changed in design in various ways within the scope without departing from the spirit of the present invention.

For example, in the subject detection processing (refer to FIG. 2), the human face image is detected as the specific subject image in the frame image F; however, this is merely an example, and the specific subject image according to the present invention is not limited to this, and is changeable appropriately and arbitrarily.

Moreover, in the above-described embodiment, as the similarity degree information, there are illustrated: the evaluation value related to the similarity degree between the image of the region B and the predetermined reference image; the number of the tentative candidate regions of the specific subject image, which are detected from the plurality of reduced images at the substantially equal positions; and the like; however, these are merely an example, and the similarity degree information according to the present invention is not limited to these, and is changeable appropriately and arbitrarily.

Moreover, in the above-described embodiment, the discrimination information setting section 6 is provided, and the discrimination information (for example, the detection frame Wb and the like) for displaying the specified image region D of the specific subject image in a discriminating manner is set; however, it is possible to appropriately and arbitrarily make a change as to whether or not to provide the discrimination information setting unit 6, that is, as to whether or not to set the discrimination information for displaying the specific subject image, which is specified by the image region specifying unit 5h, in a discriminating manner.

Moreover, the configuration of the image capturing apparatus 100, which is illustrated in the above-described embodiment, is merely an example, and the configuration thereof according to the present is not limited to this. For example, the image capturing apparatus 100 is illustrated as the subject determination apparatus; however, the subject determination apparatus according to the present invention is not limited to this. That is to say, though the images generated from the captured image are illustrated as such frame images F that serves as the processing targets, the images concerned just need to be frame images, which are to be sequentially obtained by predetermined obtaining means, in the case where the subject determination apparatus is composed of an apparatus different from the image capturing apparatus 100.

Moreover, the similarity degree evaluation value calculation unit 5c is provided; however, it is not always necessary to provide the similarity degree evaluation value calculation unit 5c concerned. For example, predetermined obtaining means may obtain the evaluation values of the respective candidate regions of the specific subject image together with the frame images F.

In addition, in the above-described embodiment, a configuration is adopted, in which functions as the obtaining means, the first similarity degree determining means, the second similarity degree determining means, the information obtaining means, and the subject determining means are realized in such a manner that the image obtaining unit 5a, first similarity degree determination unit 5d, second similarity degree determination unit 5e, related information obtaining unit 5f and subject determination unit 5g of the image processing section 5 are driven under the control of the central control section 11; however, such a configuration according to the present invention is not limited to this. A configuration in which a predetermined program and the like are executed by the CPU of the central control section 11 may be adopted.

That is to say, in a program memory (not shown) that memorizes programs therein, a program is memorized, which includes an obtaining processing routine, a first similarity degree determination processing routine, a second similarity degree determination processing routine, an information obtaining processing routine, and a subject determination processing routine. Then, by the obtaining processing routine, the CPU of the central control section 11 may be allowed to function as the obtaining means for sequentially obtaining the frame images F. Moreover, by the first similarity degree determination processing routine, the CPU of the central control section 11 may be allowed to function as the first similarity degree determining means for determining whether or not the similarity degree between the predetermined reference image and the image of the candidate region A of the specific subject in the frame image Fn obtained by the obtaining means is equal to or more than the first threshold value. Furthermore, by the second similarity degree determination processing routine, the CPU of the central control section 11 may be allowed to function as the second similarity degree determining means for determining whether or not the similarity degree is equal to or more than the second threshold value smaller than the first threshold value in the case where it is determined that the similarity degree concerned is not equal to or more than the first threshold value by the first similarity degree determining means. Moreover, by the information obtaining processing routine, the CPU of the central control unit 11 may be allowed to function as the information obtaining means for obtaining the information related to the similarity degree between the predetermined reference image and the image of the region B, which corresponds to the candidate region A in the frame image Fm obtained the predetermined number of frames before from the frame image Fn, in the case where it is determined that the similarity degree of the candidate region A is equal to or more than the second threshold value by the second similarity degree determining means. Furthermore, by the subject determination processing routine, the CPU of the central controls section 11 may be allowed to function as the subject determining means for determining whether or not the candidate region A is the image region D of the specific subject image based on the information obtained by the information obtaining means.

In a similar way, such a configuration may be adopted, in which subject specifying means, the first memorization controlling means, image reducing means, detecting means, second memorization controlling means, and candidate specifying means are also realized in such a manner that a predetermined program and the like are executed by the CPU of the central control section 11.

Moreover, as computer-readable mediums which store therein the programs for executing the above-described respective pieces of processing, it is also possible to apply a non-volatile memory such as a flash memory, and a portable recording medium such as a CD-ROM as well as a ROM, a hard disk and the like. Moreover, as a medium that provides data of the programs through a predetermined communication line, a carrier wave is also applied.

Some of the embodiments of the present invention have been described; however, the scope of the present invention is not limited to the above-mentioned embodiments, and incorporates the scope of the invention, which is described in the scope of claims, and incorporates equilibrium ranges thereof.

The entire disclosure of Japanese Patent Application No. 2012-024947 filed on Feb. 8, 2012 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A subject determination apparatus comprising:
   an image obtaining unit that sequentially obtains frame images;
   a first obtaining unit that obtains, from a first region in a first frame image from among the obtained frame images, a first degree of similarity to a specific subject image;
   a first similarity degree determination unit that determines whether or not the first degree of similarity is equal to or more than a first threshold value;
   a first subject determination unit that determines that the first region is a region of the specific subject image, when the first similarity degree determination unit determines that the first degree of similarity is equal to or more than the first threshold value;
   a second obtaining unit that obtains, from a second region in a second frame image from among the obtained frame images, a second degree of similarity to the specific subject image, the second frame image being an image obtained before the first frame image by the image obtaining unit;
   a second similarity degree determination unit that determines whether or not the second degree of similarity is equal to or more than a second threshold value; and
   a second subject determination unit that determines that the first region is the region of the specific subject image, when (i) the first similarity degree determination unit determines that the first degree of similarity is not equal to or more than the first threshold value, and (ii) the second similarity degree determination unit determines that the second degree of similarity is equal to or more than the second threshold value.

2. The subject determination apparatus according to claim 1, further comprising:
- an image reduction unit that sequentially reduces the frame images obtained by the image obtaining unit with a predetermined ratio to generate reduced images;
- a detection unit that detects tentative candidate regions of the specific subject image from the plurality of the reduced images, the tentative candidate regions being located at corresponding positions in the plurality of the reduced images; and
- a number information obtaining unit that obtains a number of the tentative candidate regions, the tentative candidate regions being detected from the plurality of the reduced images,
- wherein the second subject determination unit determines that the first region is the region of the specific subject image based on the number of the tentative candidate regions obtained by the number information obtaining unit.

3. The subject determination apparatus according to claim 1, wherein the specific subject image includes a face image.

4. The subject determination apparatus according to claim 1, wherein the frame images are images generated from a captured image.

5. The subject determination apparatus according to claim 1, wherein a position of the second region in the second frame image is a substantially same position as a position of the first region in the first frame image.

6. The subject determination apparatus according to claim 1, further comprising:
- a third similarity degree determination unit that determines whether or not the first degree of similarity is equal to or more than a third threshold value, wherein the third threshold value is smaller than the first threshold value, when the first similarity degree determination unit determines that the first degree of similarity is not equal to or more than the first threshold value,
- wherein the second obtaining unit obtains the second degree of similarity, when the third similarity degree determination unit determines that the first degree of similarity is not equal to or more than the third threshold value.

7. The subject determination apparatus according to claim 6, wherein the third threshold value is the second threshold value.

8. A method of determining a subject by using a subject determination apparatus, the method comprising:
- sequentially obtaining frame images;
- obtaining, from a first region in a first frame image from among the obtained frame images, a first degree of similarity to a specific subject image;
- determining whether or not the first degree of similarity is equal to or more than a first threshold value;
- determining that the first region is a region of the specific subject image, when it is determined that the first degree of similarity is equal to or more than the first threshold value;
- when it is determined that the first degree of similarity is not equal to or more than the first threshold value, (i) obtaining, from a second region in a second frame image from among the obtained frame images, a second degree of similarity to the specific subject image, the second frame image being an image obtained before the first frame image, and (ii) determining whether or not the second degree of similarity is equal to or more than a second threshold value; and
- determining that the first region is the region of the specific subject image, when it is determined that the first degree of similarity is not equal to or more than the first threshold value and that the second degree of similarity is equal to or more than the second threshold value.

9. A non-transitory computer-readable recording medium having a program stored thereon that is executable to control a computer to function as units comprising:
- a first obtaining unit that obtains, from a first region in a first frame image from among sequentially obtained frame images, a first degree of similarity to a specific subject image;
- a first similarity degree determination unit that determines whether or not the first degree of similarity is equal to or more than a first threshold value;
- a first subject determination unit that determines that the first region is a region of the specific subject image, when the first similarity degree determination unit determines that the first degree of similarity is equal to or more than the first threshold value;
- a second obtaining unit that obtains, from a second region in a second frame image from among the sequentially obtained frame images, a second degree of similarity to the specific subject image, the second frame image being an image obtained before the first frame image from among the sequentially obtained frame images;
- a second similarity degree determination unit that determines whether or not the second degree of similarity is equal to or more than a second threshold value; and
- a second subject determination unit that determines that the first region is the region of the specific subject image, when (i) the first similarity degree determination unit determines that the first degree of similarity is not equal to or more than the first threshold value, and (ii) the second similarity degree determination unit determines that the second degree of similarity is equal to or more than the second threshold value.

* * * * *